March 20, 1956  J. W. FRENCH ET AL  2,738,882
AUTOMOBILE TRAY
Filed May 26, 1953  2 Sheets-Sheet 1
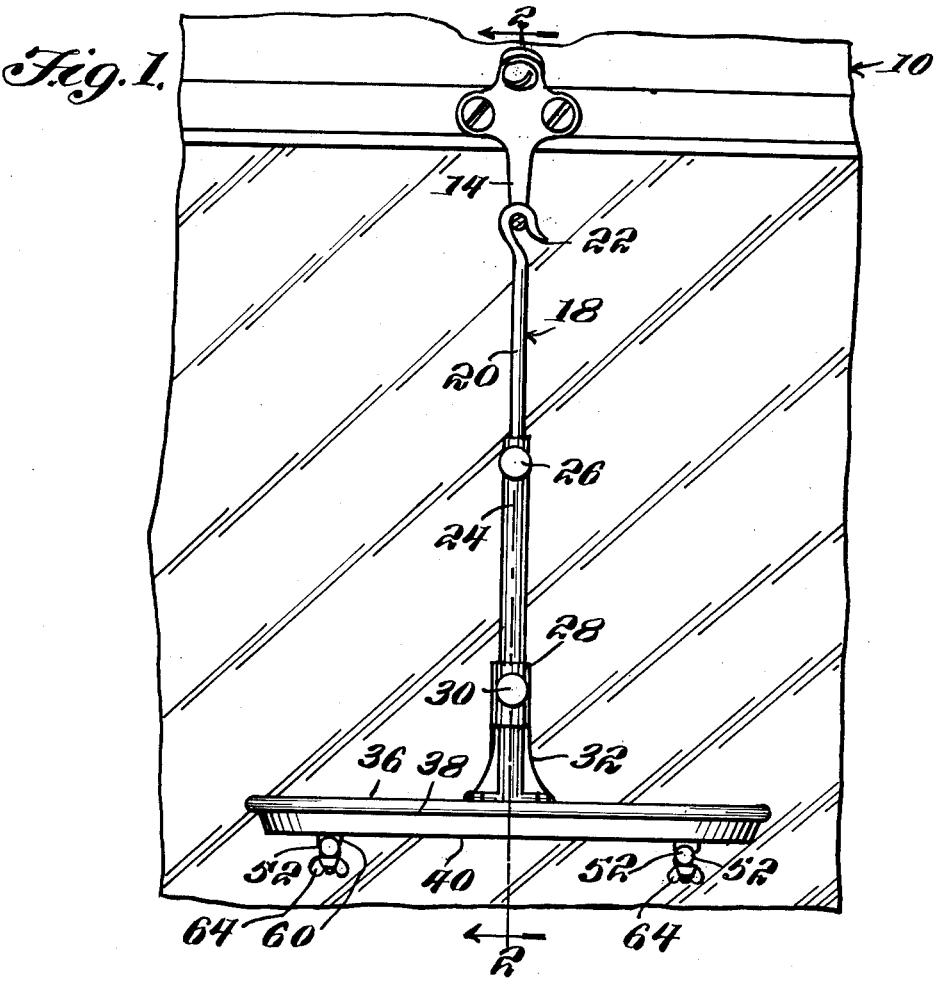
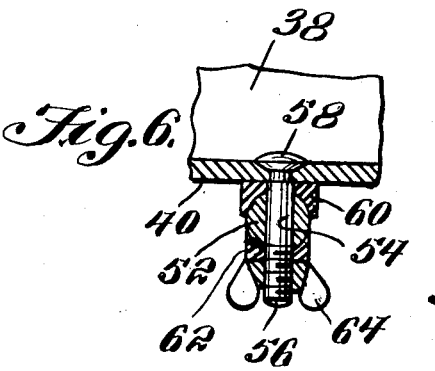
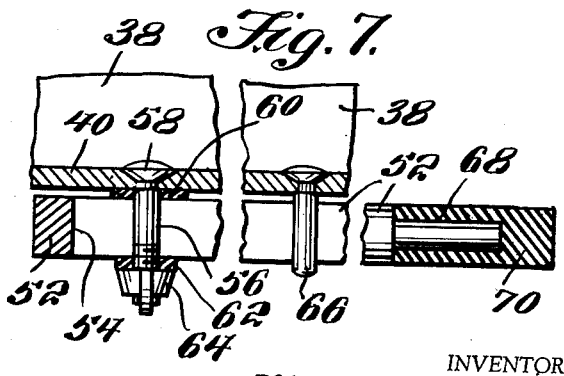
INVENTORS
JOHN W. FRENCH
JAMES F. LEGGETT
BY
McMorrow, Berman & Davidson
ATTORNEYS

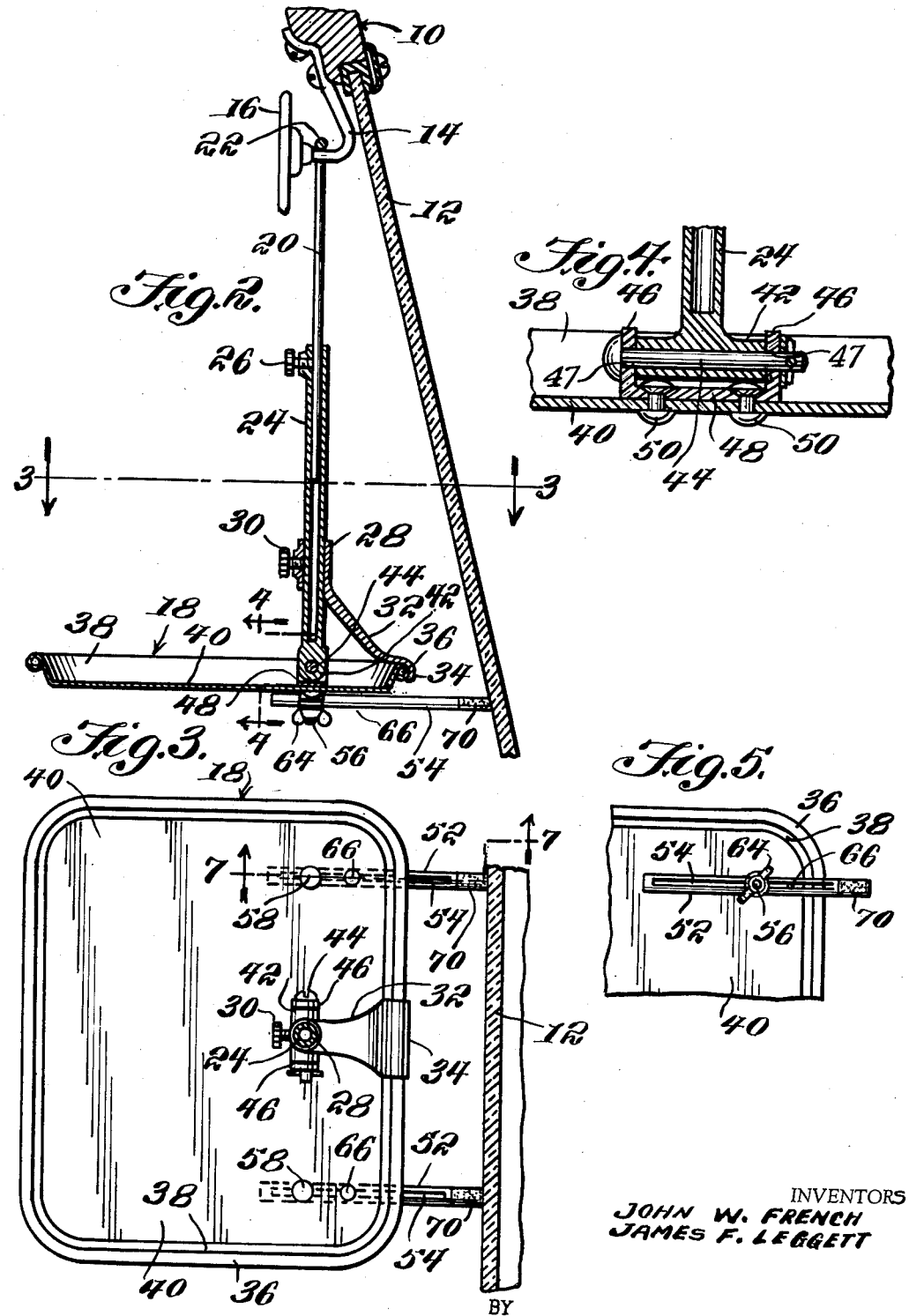

United States Patent Office 2,738,882
Patented Mar. 20, 1956

2,738,882
AUTOMOBILE TRAY
John W. French and James F. Leggett, Bloomfield, Mo.
Application May 26, 1953, Serial No. 357,588
3 Claims. (Cl. 211—117)

This invention relates to a tray for automobiles, the tray constituting the present invention being adapted to be supported from the rear view mirror support bracket of the vehicle.

It is one important object of the present invention to provide a tray of the type stated which, when suspended from an automobile rear view mirror support bracket, will automatically gravitate to a proper position in spaced relation to the windshield of the vehicle, where it will be conveniently disposed for use by the vehicle occupants.

Another object of importance is to provide a tray of the character described which will be of a completely collapsible nature, thus to permit the tray to be readily folded, and stored in a comparatively small area.

Another object of importance is to provide a tray as described wherein the means utilized for suspending the tray member of the device from the rear view mirror support bracket will be adjustable as to length, thereby to adapt the device for use in automobiles of different makes and sizes.

Another object of importance is to provide a tray assembly for use by the occupants of an automobile, which assembly will include a plurality of brace members, that are adapted to project laterally from the tray a selected distance, into engagement with the vehicle windshield, in such a way as to support the tray in a perfectly horizontal plane, forwardly of the windshield.

Another object of importance is to provide a tray device as described in which the means for suspending the tray from the rear view mirror support bracket, and the brace means extending from the tray into engagement with the windshield, will cooperate for the purpose of not only properly positioning the tray within the passenger compartment of the vehicle, but also steadying the tray in the selected position.

Yet another object is to provide a tray device as described which, though so designed as to attain the several desirable objects noted above, will still be capable of manufacture at a minimum of cost.

Other objects will appear from the following description, the claims appended thereto, and from the annexed drawings, in which like references designate like parts throughout the several views, and wherein:

Figure 1 is a front elevational view of a tray formed in accordance with the present invention, a vehicle within which the tray is suspended being illustrated fragmentarily;

Figure 2 is a sectional view on line 2—2 of Figure 1;

Figure 3 is a sectional view on line 3—3 of Figure 2;

Figure 4 is an enlarged, detail sectional view on line 4—4 of Figure 2;

Figure 5 is a fragmentary bottom plan view of the tray member;

Figure 6 is an enlarged, detail sectional view taken transversely through one of the brace members; and Figure 7 is a longitudinal sectional view through said brace member taken substantially on line 7—7 of Figure 3, portions being broken away.

The tray assembly constituting the present invention is adapted to be suspended within the passenger compartment of a conventional automobile designated generally by the reference numeral 10, and having a windshield 12, a rear view mirror support bracket 14, and a rear view mirror 16. The invention has been designated generally at 18, and includes a hanger means, which hanger means comprises, in its basic essentials, a supporting rod engageable over the bracket 14, and a tubular member in which said rod is telescoped.

The supporting rod has been designated by the reference numeral 20, and is of straight formation from end to end, said supporting rod being formed at its upper end with a hook 22 engageable over the support bracket 14.

At its lower end, rod 20 is telescoped within a tubular member 24, a set screw 26 being threadable in the tubular member into engagement with rod 20, for the purpose of holding the rod and tubular member against relative longitudinal movement, in each position to which the rod 20 is telescopically adjusted within the tubular member.

By reason of the telescopic adjustment of the hanger means defined by rod 20 and tubular member 24, the device constituting the invention is usable in automobiles of various makes and sizes, it being understood that the construction illustrated and described permits the tray member of the device to be supported at selected elevations within the passenger compartment.

Mounted upon the tubular member 24, intermediate opposite ends of said tubular member, is a leveling brace support sleeve 28, said sleeve being secured fixedly to the tubular member by means of a set screw 30, threadable in the sleeve 28 and extending into an opening formed in the tubular member 24. The sleeve 28 is integral with a leveling brace 32, which can be formed from a piece of flat bar material bent to shape. As will be noted, the brace 32 is extended outwardly and downwardly at an incline from the sleeve 28, the brace being progressively widened in the direction of its lower end as shown in Figure 3. At its lower end, the leveling brace 32 is formed with a curved lower or outer end edge 34. The curved edge 34 of leveling brace 32 is adapted to overlie a rolled edge 36 formed upon a peripheral, upstanding flange 38 of a tray member 40. Tray member 40 in the illustrated example of the invention is of rectangular outer configuration, but could be otherwise shaped if desired.

As shown in Figure 4, the tubular member 24, at its lower end, is integral with a transversely disposed hinge sleeve 42, receiving a hinge pin 44 the opposite ends of which are engaged in bearing openings 47 formed in the upstanding legs 46 of a U-shaped bracket 48 riveted as at 50 to the bottom of the tray member.

By reason of this arrangement, it is seen that when the tray device is not in use, the hanger means 20, 42 can be pivoted bodily about the axis of pin 44, so as to collapse substantially into the general plane of the tray member 40, the rod 20 being, of course, adapted to be fully removed from the associated tubular member 24, if desired. Should one not desire to remove rod 20, said rod could be telescoped for substantially its full length within the tubular member.

It is also important to note that the hanger means is connected to the tray member a short distance in front of the back edge of the tray member. Ordinarily, this would cause the front portion of the tray member to swing downwardly. However, this tendency on the part of the tray member is resisted by the leveling brace 32, which brace engages the flange of the tray member in such a way as to hold the tray member perfectly horizontal, when the device is in use.

Underlying the tray member 40 are brace members 52. These are formed as elongated bars or rods of circular cross sectional shape, each brace member being formed, for substantially its full length, with a closed longitudinal slot 54.

Extending into the slot 54 of each member 52 is a main guide pin 56, the upper end of which is connected to the underside of the tray member in any suitable manner, as for example, by a rivet 58. Interposed between the member 52 and the tray member, and circumposed about the pin 56, is a washer 60 of soft rubber or the like, said washer having a curved underside complementing the transverse curvature of the member 52.

Circumposed about the lower end portion of the pin 56 is a spacer washer 62, the upper surface of which is curved complementarily to the transverse curvature of the member 52.

The washer 62 has a flat underside, and has its pin-receiving center opening formed with a smooth surface.

The lower end portion of the pin 56 is threaded, to receive a wing nut 64, said wing nut being movable upwardly against the spacer washer 62.

By reason of this construction, it will be seen that the brace member 52 can be adjusted in the direction of its length either inwardly or outwardly of the tray member. In each position to which the brace member 52 is so adjusted, the wing nut 64 can be turned home, so as to cause the member 52 to be clampably engaged between washers 60, 62 and thus held in the selected position of adjustment.

An auxiliary guide pin 66 is connected to and depends from the underside of the tray member, in spaced relation to the main guide pin 56, and also projects through the slot 54. Straight line movement of the member 52 in the direction of its length is thus assured.

The respective brace members 52 are extendable into engagement with the windshield 12 of the vehicle, and those ends of the brace members that engage the windshield have reduced axial extensions 68 formed thereon, engaging in axially recessed snubbers 70 of soft rubber or the like, which snubbers engage against the inner surface of the windshield.

It will be seen that the brace members thus cooperate with the hanger means in supporting the tray member at a selected elevation, in spaced relation to the windshield. It is important to note, in this regard, that the adjustments of the several parts relative to one another adapts the device for use in automobiles of different makes and designs.

In this regard, the sleeve 28 not only can be secured fixedly to the tubular member 24, in the normal position shown in Figure 2, but also can be adjusted longitudinally of the tubular member, and clampably engaged with the tubular member by means of the set screw 30. Ordinarily, the sleeve 28 would not be moved from the position shown, and this normal or main position of sleeve 28 can be considered as one which will hold the tray member 40 horizontal whenever the hanger means 20, 24 is disposed vertically as shown in Figure 2. However, one could, if he so desired, still keep the tray member 40 level, even if the hanger means 20, 24 is not vertically disposed, by adjusting the leveling brace 32 to a new position longitudinally of the tubular member 24.

In any event, the hanger means, leveling brace, and brace members all cooperate to insure that the tray member will be properly positioned, and will be steadied in the selected position.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. An automobile tray comprising: a tray member; a tubular member hinged at one end to the face of the tray member; a rod telescopically connected to said tubular member and having a hook for suspending the tray member from an overhead support within a vehicle; a leveling brace vertically adjustable on the tubular member and engaging one side of the tray member to hold the same level; and brace means projecting laterally from said tray member for engaging a surface spaced outwardly from one side of the tray member.

2. An automobile tray comprising: a tray member; a tubular member hinged at one end to the face of the tray member; a rod adjustably connected to said tubular member and having a hook for suspending the tray member from the rear view mirror support bracket of an automobile; a leveling brace adjustably connected to and extending outwardly and downwardly from the tubular member and engaged with one side of the tray member for positioning the same in a horizontal plane, and brace means projecting laterally from said tray member for engaging the surface spaced outwardly from one side of the tray member.

3. An automobile tray comprising: a tray member; a tubular member hinged at one end to the face of the tray member; a rod adjustably conected to said tubular member and having a hook for suspending the tray member from the rear view mirror support bracket of an automobile; a leveling brace adjustably connected to and extending outwardly and downwardly from the tubular member and engaged with one side of the tray member for positioning the same in a horizontal plane; and brace means projecting laterally from said tray member for engaging a surface spaced outwardly from one side of the tray member, said brace means including a pair of brace members slidably mounted on the underside of the tray member, said brace members having one end extending horizontally and outwardly from said side of the tray member.

References Cited in the file of this patent

UNITED STATES PATENTS

| | | |
|---|---|---|
| 1,493,036 | Hay | May 6, 1924 |
| 1,683,526 | Campbell | Sept. 4, 1928 |
| 2,002,328 | Mitchell | May 21, 1935 |
| 2,304,705 | Pate | Dec. 8, 1942 |
| 2,314,550 | Olman | Mar. 23, 1943 |
| 2,510,646 | Meers | June 6, 1950 |
| 2,539,923 | Phaneuf | Jan. 30, 1951 |